United States Patent [19]
Fujita et al.

[11] Patent Number: 5,359,588
[45] Date of Patent: Oct. 25, 1994

[54] OPTICAL RECORDING/REPRODUCING APPARATUS

[75] Inventors: Teruo Fujita; Masahisa Shinoda; Naoyuki Egusa; Yasuyuki Sato; Manabu Koike, all of Nagaokakyo, Japan

[73] Assignee: Mitsubishi Denki Kabushiki Kaisha, Tokyo, Japan

[21] Appl. No.: 16,861

[22] Filed: Feb. 11, 1993

[30] Foreign Application Priority Data

Feb. 12, 1992 [JP] Japan .................................. 4-025151
Jun. 8, 1992 [JP] Japan .................................. 4-147306

[51] Int. Cl.$^5$ ............................................. G11B 7/125
[52] U.S. Cl. .................................... 369/110; 369/112; 359/710
[58] Field of Search ................ 359/668, 669, 710, 737; 369/112, 100, 119, 44.03, 44.21, 44.32, 110, 44.22, 44.23, 44.24, 44.37; 250/201.5, 216

[56] References Cited

U.S. PATENT DOCUMENTS

| | | | |
|---|---|---|---|
| 4,333,173 | 6/1982 | Yonezawa et al. | 369/122 |
| 4,841,510 | 6/1989 | Yoshizawa | 369/44.23 |
| 4,942,584 | 7/1990 | Karaki et al. | 372/29 |
| 5,223,970 | 6/1993 | Oono et al. | 369/112 |

FOREIGN PATENT DOCUMENTS

| | | |
|---|---|---|
| 59-65948 | 4/1984 | Japan . |
| 60-23994 | 11/1985 | Japan . |
| 61-53775 | 11/1986 | Japan . |
| 62-32532 | 7/1987 | Japan . |
| 1312747 | 12/1989 | Japan . |

*Primary Examiner*—Constantine Hannaher
*Assistant Examiner*—Don Wong

[57] ABSTRACT

An optical recording apparatus which reduces light loss by expanding the laser beam diameters irradiated from a plurality of beam sources, and reducing the expanded beam diameters immediately before focusing the beams onto an information recording medium to make the beams circular, thereby minimizing deviation of the laser beam from the optical axis. An optical system for use in recording apparatus with a multi-beam optical head provided with a plurality of laser beam sources in a fixed unit which reduces light loss by minimizing deviation of the laser beam from the optical axis, and also by maintaining the laser power of each laser beam at a predetermined intensity independent of changes in distance between the fixed unit half and the moving unit half of the optical system by detecting intensities of the laser beams focused on a recording medium.

22 Claims, 20 Drawing Sheets

5,359,588

OPTICAL RECORDING/REPRODUCING APPARATUS

BACKGROUND OF THE INVENTION

1. Field of the Invention

This invention relates to an optical system for use in recording apparatus which has a plurality of light sources and records information in a parallel manner.

2. Description of the Related Art

An optical recording apparatus is conventionally known which uses optical means such as a laser beam to record information in concentrical or helical paths on a rotating disk-like information recording medium. With the advance and spread of information processing apparatus, such as computers, the information quantity to be dealt with expands. Accordingly, an optical recording apparatus is needed to shorten the access time for searching required information from recorded information and to increase the information quantity (transfer rate) which can be recorded in a unit time. To comply with this need, various improvements have been done to the optical head which performs the optical recording.

A known method of improving the transfer rate is disclosed in, for example, Japanese Patent Publications (Kokai) Nos. SHO59-65,948 and HEI1-312,747. In this method, a semiconductor laser array device emitting a plurality of laser beams is used to record and reproduce information in a parallel manner. Hereinafter, the configuration of this conventional example will be described with reference to the figures.

FIG. 1 is a plan view showing the optical system of the conventional optical recording apparatus. In the figure, 51 designates a semiconductor laser array device which emits four laser beams 52. FIG. 2 is a perspective view of the semiconductor laser array device 51. The four laser beams 52 are emitted from a single active layer 53. In the direction along which the semiconductor laser array device 51 emits the laser beams, a collimator lens 54, a beam splitter 55, and an objective 56 are sequentially arranged. The objective 56 forms four converged light spots 52A on the surface of an information recording medium 57. According to Japanese Patent Publication (Kokai) No. HEI1-312,747, the central two light spots among the four light spots are formed on a flat portion of the information recording medium 57, and the side two converged spots are formed on guide grooves of the medium 57. This arrangement is irrelevant to the object of the invention, and therefore in the following description it is assumed that four light spots 52A are respectively formed on four adjacent information tracks on the surface of the information recording medium 57. The four laser beams 52 reflected from the information recording medium 57 are reflected by the beam splitter 55, and then divided by a compound prism 58 into two groups. One group enters through a lens 59 an optical detector 60 which comprises at least four light receiving elements. In the direction along which the other group proceeds, a first prism 61 and a second prism 62 are arranged. Optical detectors 63 and 64 are disposed in the transmission directions of the reflecting planes 61A and 62A of these prisms, respectively. In the optical recording apparatus shown in FIG. 1, the portion consisting of the components other than the information recording medium 57 is generally called an optical head.

The operation of the apparatus will be described. The four light spots 52A are formed on the surface of the information recording medium 57 by the objective 56 so that they are respectively positioned on four adjacent information tracks. Using the four light spots 52A, therefore, information can be recorded in a parallel manner, thereby improving the transfer rate of information.

In order to record information in a parallel manner using the four light spots 52A, it is essential that each of the light spots is accurately positioned on the predetermined information track. For this purpose, the conventional apparatus uses the means which will be described below. Among the four laser beams 52 which have entered the first prism 61, because of the difference of incident angles, only one of the two side laser beams passes through the reflecting plane 61A and enters the optical detector 63. On the other hand, the remaining three laser beams are reflected from the reflecting plane 61A and enter the second prism 62. Similarly, because of the difference of incident angles, only the other one of the two side laser beams passes through the reflecting plane 62A and enters the optical detector 64. The two optical detectors 63 and 64 are two-segment optical detectors each comprising two light receiving elements, and perform a known tracking error detection method which is called the push-pull method, so as to judge whether or not the two side laser beams accurately follow the predetermined information tracks. If accurate tracking is not done, a moving mechanism (not shown) performs the correcting control so that the four light spots 52A are positioned in sequence on adjacent four information tracks.

The detection of reproduced signals is performed while the laser beams reflected from the information recording medium 57 are independently detected by the optical detector 60 which comprises at least four light receiving elements. According to this conventional apparatus, information can be recorded in a parallel manner using the four light spots, and therefore the transfer rate of information can be increased by four times.

As described above, the conventional optical recording apparatus is so constructed that the four laser beams 52 emitted from the semiconductor laser array device 51 are converted to parallel beams and then enters the objective 56. Therefore, the conventional apparatus has a problem as follows. This problem will be described with reference to FIGS. 3 through 5. FIG. 3 is a plan view of an optical system required for illustrating the problem of the conventional optical recording apparatus. In the figure, 54 and 56 designate the same components as those in FIG. 1, and the other optical components are not illustrated. The reference numeral 65 designates the optical axis of the optical system. In FIG. 3(A), S1 designates a light emitting point of the semiconductor laser array device 51 which is positioned on the optical axis 65. In this case, collimated beams 66 departing from the collimator lens 54 propagates in parallel with the optical axis 65 and enter the center of the objective 56. By contrast, in FIG. 3(B), S2 designates a light emitting point of the semiconductor laser array device 51 which is displaced by a distance H from the optical axis 65. In this case, collimated beam 67 coming out from the collimator lens 54 propagates obliquely with respect to the optical axis 65, and the central ray 67A of the collimated beams 67 enters the objective 56 with being displaced by a distance D from the optical axis 65, where the central ray 67A is defined as a ray proceeding parallel to the optical axis 65 between the semiconductor laser array device 51 and the collimator lens 54. When the focal length of the collimator lens 54 is represented by FC, the inclination U1 of the central ray 67A with respect to the optical axis 65 is given by the following expression:

$$U1 = H/FC \text{ (rad.)} \tag{1}$$

When the optical path length between the collimator lens 54 and the objective 56 is represented by L, the deviation D of the central ray 67A from the optical axis 65 at the objective 56 is given by the following expression:

$$\begin{aligned} D &= L \cdot U1 - H \\ &= (L/FC - 1) \cdot H \end{aligned} \tag{2}$$

When L/FC is sufficiently greater than 1, the above expression can be rewritten as follows:

$$D = L \cdot H/FC \tag{3}$$

In the case where the semiconductor laser array device 51 is used as light sources, all the light emitting points other than at least one light emitting point are inevitably displaced from the optical axis 65, with the result that the deviation D of a substantial value is produced in each of the laser beams. The deviation D increases in proportion to the distance H between the light emitting point S2 and the optical axis 65 and also to the optical path length L. As the deviation D increases, the portion of the collimated beams 67 which enter the objective 56 decreases. This means that it becomes impossible to obtain a laser beam which provides the predetermined optical strength on the surface of the information recording medium 57. As a result, there arises a possibility that a reliable recording of information cannot be performed.

Generally, as shown in FIG. 2, a beam emitted from a semiconductor laser device has a for field intensity pattern whose beam divergence is narrow in the direction parallel to the active layer 53 (or lateral, hereinafter direction) and wide in the vertical direction. Beams emitted from a semiconductor laser array device have a similar shape intensity pattern as that described above. When a laser beam has an ellipsoidal shape intensity pattern as mentioned above, phenomena such as that also the light spot formed on the surface of the information recording medium 57 has an ellipsoidal shape and that a portion of the laser beam is eclipsed by optical components or the like are caused. The occurrence of such phenomena leads to the loss of the optical flux. In order to prevent such phenomena from occurring, therefore, a method is sometimes employed in which known means that is called as a beam reshaping is used for correcting the ellipsoidal shape intensity pattern of a laser beam to a substantially circular shape intensity pattern.

FIG. 4 is a plan view showing the main portion of an optical system and illustrating a problem which is caused in the same manner as FIG. 3(B) in a conventional optical recording apparatus using beam reshaping means. In FIG. 4, the reference numerals 54, 56 and 65 designate the same components as those in FIG. 3. The reference numeral 68 designates beam reshaping means which expands the divergence angle in the direction of the small width of a laser beam (hereinafter, referred to as "lateral direction") so as to substantially becomes equal to the divergence angle in the direction of the large width of the laser beam (hereinafter, referred to as "vertical direction"). An example of such beam reshaping means is disclosed in, for example, Japanese Patent Publication (Kokoku) No. SHO61-53,775. The beam reshaping means 68 is disposed immediately behind the collimator lens 54. In the same manner as FIG. 3(B), S2 designates a light emitting point which is displaced by a distance H from the optical axis 65. The collimated beam 69 coming out from the collimator lens 54 is not parallel with the optical axis 65. When the distance between the collimator lens 54 and the beam reshaping means 68 is represented by L1 and the inclination of the central ray 69A with respect to the optical axis 65 within that distance is represented by U1, the following relation is established:

$$U1 = H/FC \text{ (rad.)} \tag{4}$$

The deviation D1 of the central ray 69A from the optical axis 65 at the beam reshaping means 68 is given by the following expression:

$$\begin{aligned} D1 &= L1 \cdot U1 - H \\ &= (L1/FC - 1) \cdot H \end{aligned} \tag{5}$$

The inclination of the collimated beams 69 with respect to the optical axis 65 which have passed through the beam reshaping means 68 varies depending on the beam diameter expansion ratio M of the beam reshaping means 68. In this example, the beam diameter expansion ratio M is selected to be the ratio of the divergence angle in the vertical direction of the semiconductor laser device to the divergence angle in the lateral direction (hereinafter, the ratio is referred to as "the elliptic ratio"). When the inclination of the central ray 69B of the collimated beams 69 with respect to the optical axis 65 which have passed through the beam reshaping means 68 is represented by U2, the following relation is usually satisfied:

$$U2 = U1/M = H/FC/M \text{ (rad.)} \tag{6}$$

Therefore, the deviation D2 of the central ray 69B with respect to the optical axis 65 at the objective 56 can be given by the following expression:

$$\begin{aligned} D2 &= L2 \cdot U2 - D1 \\ &= (L2/FC/M - (L1/FC - 1)) \cdot H \end{aligned} \tag{7}$$

where L2 is the distance; between the beam reshaping means 68 and the objective 56. When it is assumed that the distance L1 between the collimator lens 54 and the beam reshaping means 68 is equal to the focal length FC of the collimator lens 54, expression (7) can be simplified as follows:

$$D2 = L2 \cdot H/FC/M \tag{8}$$

When comparing the above expression with expression (3), it will be noted that, in the optical system which is provided with the beam reshaping means 68, the deviation of the central ray of a laser beam from a light emitting point which is displaced from the optical axis has a value obtained by dividing that in an optical system which is not provided with the beam reshaping means 68 by the beam diameter expansion ratio. Generally, the ratio of the divergence angle in the direction of the large width (vertical direction) to that in the direction of the small width (lateral direction) has a value from about 2 to about 4. Accordingly, the deviation in the optical system which is provided with the beam reshaping means 68 is reduced to one second or one fourth of that in an optical system which is not provided with the beam reshaping means 68. However, since the deviation varies in proportion to the optical path length L2, it is impossible to neglect the deviation unless the optical path length L2 is reduced to a sufficiently small value. As a result, there still remains a possibility that the laser beam fails to provide a predetermined optical strength.

The deviation of the central ray and the accompanying reduction of the power transmittance of an optical system will be described by illustrating a specific example. FIG. 5 is a graph showing the relationships between the optical path length and the central ray and optical system power transmittance in the optical system comprising the beam reshaping means 68. The abscissa is the optical path length L2 shown in FIG. 4, the left ordinate is the deviation of the central ray indicated by expression (8), and the right ordinate is the power transmittance of the optical system. The calculation conditions are listed below.

- The divergence angle of the semiconductor laser beam in the lateral direction was 10 deg. (full angle at half maximum).
- The divergence angle of the semiconductor laser beam in the vertical direction was 30 deg. (full angle at half maximum).
- The distance H between the light emitting point of the semiconductor laser device and the optical axis was 0.2 mm.
- The beam diameter expansion ratio M of the beam reshaping means was 3.
- The focal length FC of the collimator lens was 7 mm.
- The focal length FO of the objective was 4 mm.
- The aperture radius RO of the objective was 2 mm.
- The power transmittance of the optical components was 100%.

In the calculation of the power transmittance of the optical system, it was assumed that the intensity profile of the beam of the semiconductor laser device is a 2-dimensional Gaussian distribution. When the light emitting point is on the optical axis, the conditions are the same as those in which the optical path length L2 is 0. In this case, the deviation of the central ray does not occur and the power transmittance of the optical system is 57.5%. In contrast, when the optical path length L2 is 100 mm under the conditions listed above, the deviation D2 of the central ray is 0.95 mm and the transmittance is reduced to 51.0%.

Hereinafter, the above-discussed problem is summarized. In a conventional optical recording apparatus using a semiconductor laser array device, when a laser beam is emitted from a light emitting point which is displaced from the optical axis, a deviation between the central ray and the optical axis occurs at an objective. The amount of the deviation is in proportion to the distance between the light emitting point and the optical axis and also to the optical path length. Therefore, for a laser beam emitted from an outer light emitting point among light emitting points of the semiconductor laser array device, the loss of the light amount becomes greater. In an optical system which is provided with the beam reshaping means 68, the amount of the deviation is in inverse proportion to the beam diameter expansion ratio, and therefore the amount of the deviation may be reduced by increasing the beam diameter expansion ratio. When the beam diameter in the lateral direction is increased so that the beam diameter expansion ratio become greater than the ratio of the divergence angle in the vertical and lateral directions of the light source, however, the eclipse of an incident laser beam due to the objective increases, thereby causing a problem in that the loss of the light amount of the beam passing through the objective is caused. Furthermore, since the amount of the deviation is in proportion also to the optical path length, in an optical recording apparatus in which the optical path length cannot be shortened, there arises a big problem in that the loss of the light amount occurs in a laser beam whole light emitting point displaced from the optical axis.

Regarding the reduction of the access time, as disclosed in, for example, Japanese Patent Publication (Kokai) No. SHO60-239,943, a method is proposed in which a split type optical head is used or, among optical components constituting an optical head, the components required for the access operation are disposed in a moving unit and the other components are disposed in a fixed unit. This configuration can reduce the weight of the moving unit so that the access time is shortened.

FIG. 6 is a perspective view of a conventional optical recording apparatus in which a semiconductor laser array device and a split type optical head are combinedly used. Hereinafter, this conventional apparatus will be described.

In the figure, 1 designates a fixed unit of the split type optical head. The reference numeral 2 designates a moving unit of the split type optical head which can be moved by a driving mechanism (not shown) such as a linear motor along the radial direction (direction X shown in FIG. 6) of an information recording medium. In the fixed unit 1, the reference numeral 3 designates a semiconductor laser array device which emits a plurality of laser beams. The laser array device shown in FIG. 6 emits three laser beams. The reference numeral 4 designates a collimator lens which converts three laser beams emitted from the semiconductor laser device 3 to collimated beams, and 5 designates a beam splitter through which laser beams from the collimator lens 4 pass to be guided to the moving unit 2. In the moving unit 2, a reflecting mirror 6 and an objective 7 are arranged. Three laser beams which have passed through the beam splitter 5 pass the reflecting mirror 6 and the objective 7 in this sequence and are then converged on the information recording medium as three focused light spots 9 respectively formed on three adjacent information tracks 8. The three laser beams reflected from the information recording medium return to the fixed unit 1 and are reflected by the beam splitter 5 to be incident through a lens 10 on an optical detector 11. The reference numeral 12 designates a position detecting mechanism which consists of, for example, a linear scale and is disposed in the moving unit 2 of the split type optical head. The reference numeral 13 designates a moving unit position detection circuit which is connected to the position detecting mechanism 12, and 14 designates a laser power correction circuit which is connected to the moving unit position detection circuit 13. The reference numeral 15 designates a semiconductor laser device driving circuit which is connected to the laser power correction circuit 14, and the semiconductor laser device 3 is connected to the driving circuit 15 so that the three laser beams are independently driven. Although the apparatus of FIG. 6 has a three-beam semiconductor laser array device, any device which emits multiple beams may be used.

Next, the operation will be described. The semiconductor laser device driving circuit 15 independently drives the three laser beams of the semiconductor laser device 3. The three laser beams are converged by the objective 7 to be respectively incident on adjacent three information tracks 8 to form three converged light spots 9, so that each of the three laser beams is used for recording information. Therefore, the information recording can be performed at a triple transfer rate as compared with a conventional one-beam type optical head.

Among the optical components constituting the optical head, the optical components required for performing the access operation on the surface of the disk-like information recording medium, i.e., only the reflecting mirror 6 and objective 7 are separated from the other components to be disposed in the moving unit 2. Accordingly, the weight of the moving unit 2 can be decreased, thereby improving the access time. Reproduced signals from the three information tracks 8, focusing error signals indicative of the focusing error between the information track surface and the focused light spots 9, and track error signals indicative of the positional error between the information tracks 8 and the focused light spots 9 are detected by known detecting means. The operation and construction of such detecting means are irrelevant to the invention, and therefore their description is omitted.

Next, the method of driving the three laser beams of the semiconductor laser device 3 with a predetermined laser power will be described. In the split type optical head, since the position of the moving unit 2 or the position of the objective 7 varies in accordance with the access operation, the optical axis deviation D indicated by expression (2) described above varies depending on the position of the moving unit 2.

FIG. 7 is a development of a plan view of the optical system for illustrating the above description in more detail. In the figure, only the components required for description are shown. In the case that the distance L between the collimator lens 4 and the objective 7 is shortest, the moving unit 2 is located at position A which corresponds to the outer most track of the information recording medium. By contrast, in the case that the distance L between the collimator lens 4 and the objective 7 is longest, the moving unit 2 is located at position C which corresponds to the inner most track of the information recording medium. The position B of the moving unit 2 is an intermediate position between the positions A and C.

FIG. 8 is a graph showing the relationship between the position of the moving unit 2 in FIG. 6 and the laser power transmittance at the objective 7. The example shown in FIGS. 7 and 8 uses a three-beam type semiconductor laser device. In this example, the light emitting point of the center laser beam among those of the three laser beams is positionally adjusted to be located on the optical axis, and therefore the above-mentioned inclination U1 with respect to the optical axis 65 does not occur. As shown in FIG. 8, accordingly, the laser power transmittance of the center laser beam is constant irrespective of the position of the moving unit 2. In contrast, the light emitting points of the side two laser beams are inclined with respect to the optical axis 65. Since the optical axis deviation D due to the inclination with respect to the optical axis 65 varies in accordance with expression (2), the reduction of the laser power transmittance is maximum when the moving unit 2 is located at the position C. Even when the moving unit 2 is located at the position A, the optical axis deviation D occurs, and therefore the laser power transmittance of the side two laser beams is smaller than that of the center laser beam.

The relationship between the position of the moving unit 2 and the laser power transmittance which is shown in FIG. 8 depends on the distance H between the light emitting point S2 of the laser beam and the optical axis 65, the focal length FC of the collimator lens and the distance L between the collimator lens and the objective. However, the variation of the laser power transmittance of each laser beam will be made apparent by moving the moving unit 2 from the outer most track of the information recording medium to the inner most track after the step of assembling the optical recording apparatus.

Accordingly, in the configuration of FIG. 6, the position detecting mechanism 12 outputs a signal for detecting the position of the moving unit 2. This signal is processed by the moving unit position detection circuit 13 to be output as a signal indicative of the absolute position of the moving unit 2. In response to the variation of the laser power transmittance of each laser beam, the laser power correction circuit 14 corrects depending on the position of the moving unit 2 the preset value of the laser power, so that each of the laser beams maintains the predetermined recording power on the surface of the information recording medium. On the basis of the corrected value, furthermore, the semiconductor laser device driving circuit 15 drives the semiconductor laser device 3 to control the power of each laser beam. Irrespective of the position of the moving unit 2, therefore, each laser beam can maintain the predetermined laser power on the surface of the information recording medium.

In the conventional optical recording/reproducing apparatus having the above-mentioned configuration, it is necessary to accurately detect the position of the moving unit 2, and the position detecting mechanism 12 and moving unit position detection circuit 1 are provided for this purpose. In order to correct the variation of laser power depending on the position of the moving unit 2, the laser power transmittance must be previously measured in the step of assembling the optical recording apparatus, and the laser power correction circuit 14 must be provided which functions so as to maintain the laser power transmittance at a predetermined value. These requirements cause the size of the apparatus to be increased and further the assembling time to be lengthened, thereby increasing the manufacturing cost.

In the conventional apparatus, the laser power is corrected on the basis of the position of the moving unit 2 and laser power transmittance at this position which are previously measured in the step of assembling the apparatus. Therefore, there is a problem in that, when the time-varying variation of the laser power transmittance due to the deterioration of the semiconductor laser device 3, dust in the optical system, etc. occurs, it is impossible to irradiate the information recording medium with a required laser power and therefore the recording of information cannot be stably performed.

SUMMARY OF THE INVENTION

The invention has been conducted in order to solve the above-mentioned problems. A first object of the invention is to provide an optical system for use in recording apparatus in which, after laser beams emitted from a laser array device functioning as a light source are converted to collimated beams by a collimator lens, the laser beam diameters are expanded in the direction of the arrangement of a plurality of light emitting points to form a plurality of nearly isotropic collimated beams, and the expanded collimated beam diameters are reduced in the above-mentioned direction immediately before an objective, whereby the loss of the light amount of a laser beam emitted from a light emitting point which is displaced from the optical axis and passing through the objective can be reduced.

A second object of the invention to provide an optical system for use in recording apparatus in which laser beams emitted from a laser array device having a plurality light emitting points, the laser power of a laser beam emitted from a light emitting point that is displaced from the optical axis can be maintained at a predetermined level.

The above and further objects and features of the invention will more fully be apparent from the following detailed description with accompanying drawings.

DESCRIPTION OF THE PREFERRED EMBODIMENTS

Hereinafter, the optical recording apparatus of the invention will be described with reference to the drawings.

Embodiment 1

Figure 1:
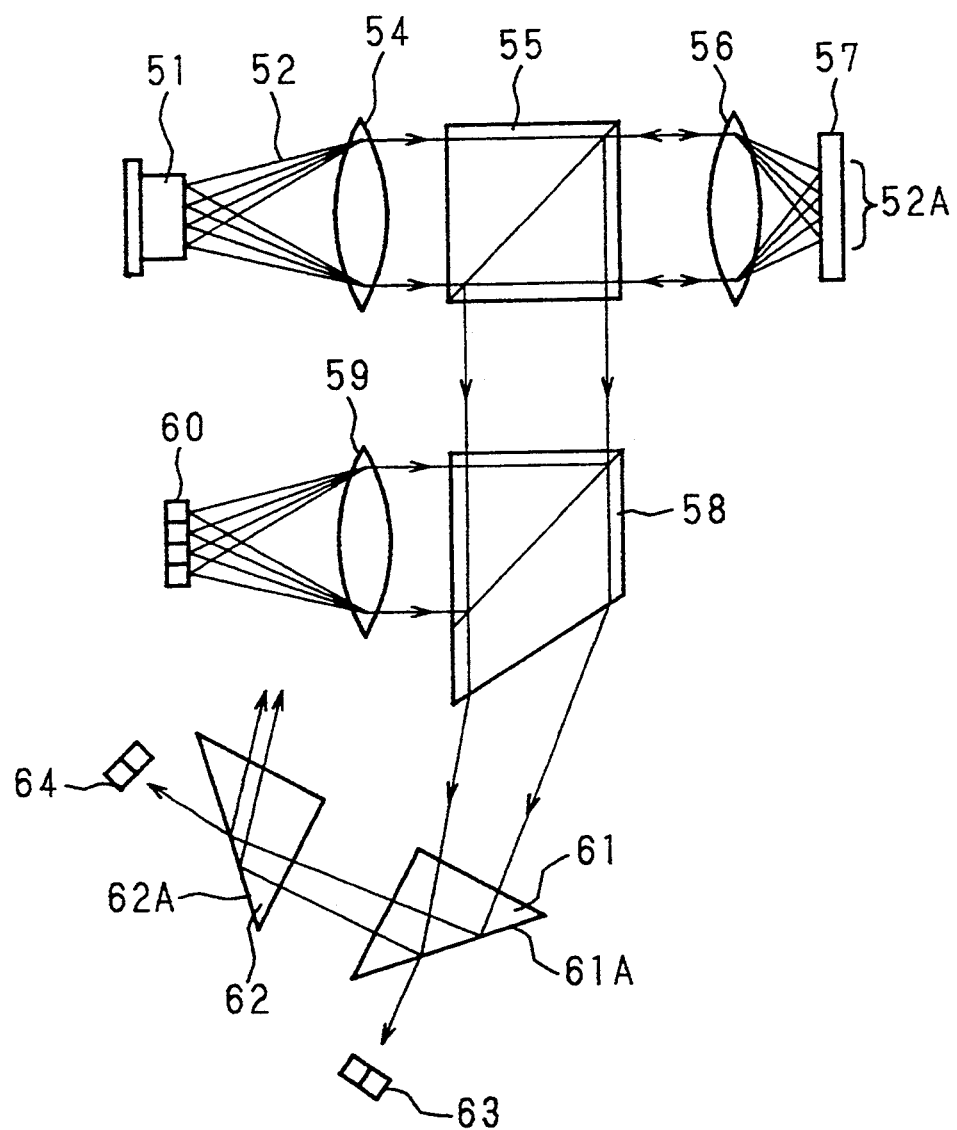
FIG. 1 is a plan view showing an optical system of a conventional optical recording apparatus.
Figure 2:
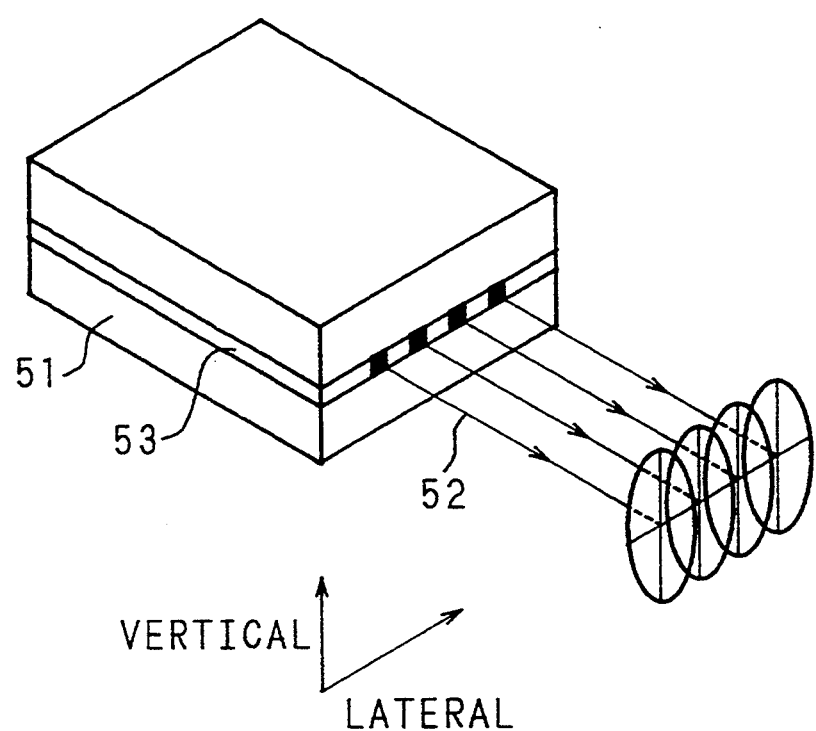
FIG. 2 is a perspective view of a semiconductor laser array device.
Figure 3A:
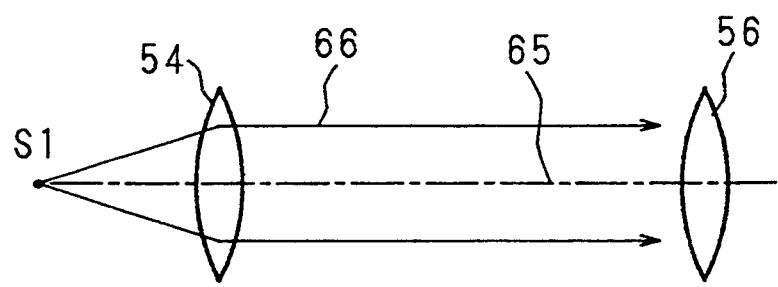
FIG. 3(A) and FIG. 3(B) are plan views showing the main portion of an optical system of the optical recording apparatus of FIG. 1.
Figure 3B:
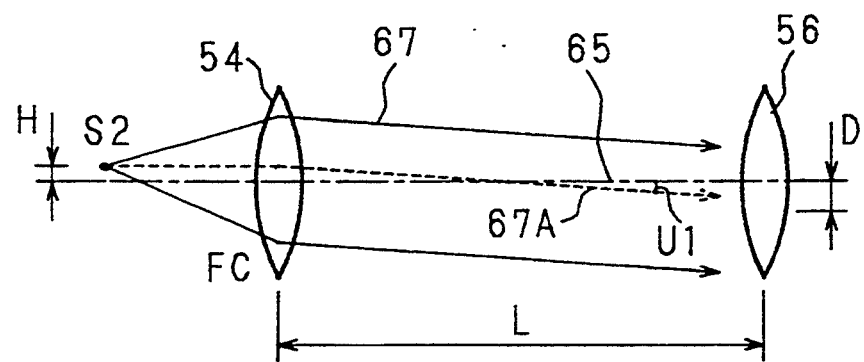
Figure 4:
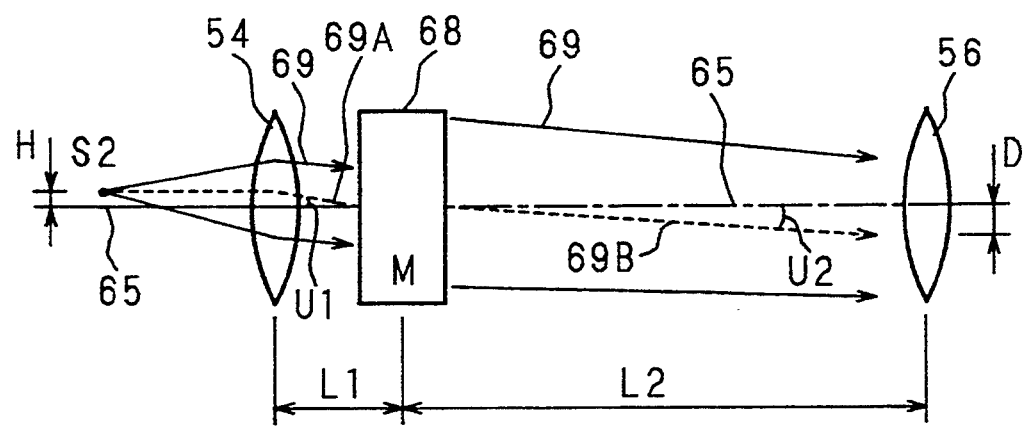
FIG. 4 is a plan view showing the main portion of an optical system of a conventional optical recording apparatus comprising beam reshaping means.
Figure 9:
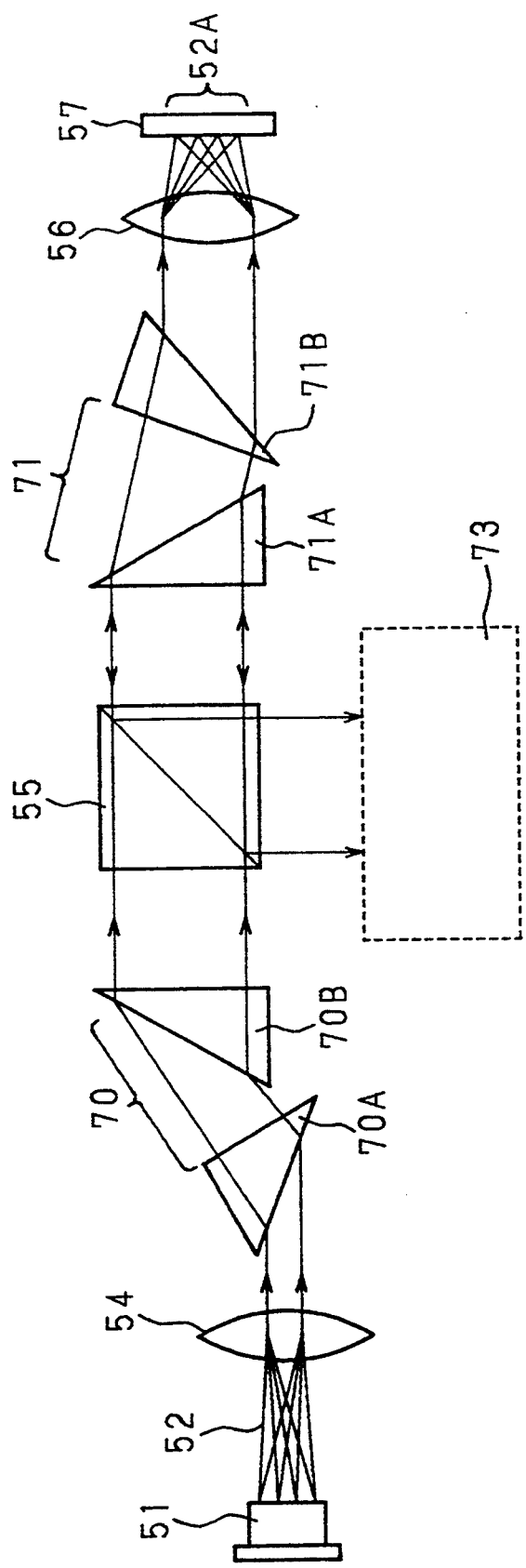
FIG. 9 is a plan view of an optical system of a first embodiment of the optical recording apparatus of the invention.

FIG. 9 is a plan view of an optical system of a first embodiment of the optical recording apparatus of the invention. In the figure, the reference numerals 51, 52, 52A, 54 and 57 designate the same components as those in the conventional apparatus of FIG. 1. The reference numeral 70 designates the first beam reshaping means which is disposed immediately behind the collimator lens 54 along the direction of the laser beam propagation, so as to function as an anamorphic beam diameter expander in the direction of the arrangement of the light emitting points of the semiconductor laser array device 51. The reference numeral 71 designates the second beam reshaping means which is disposed immediately before the objective 56 along the direction of the laser beam propagation direction, so as to function as an anamorphic beam diameter reducer in the direction of the arrangement of the light emitting points of the semiconductor laser array device 51. The first and second beam reshaping means 70 and 71 may be realized by any of various known systems. In this embodiment, these means comprise triangular prisms 70A and 70B, and 71A and 71B, respectively. The reference numeral 73 designates a detection optical system which detects light beams reflected from the surface of the information recording medium 57 to perform the reproduction of information signals, etc., and its detailed description is omitted.

The operation of the apparatus will be described. In FIG. 9, the laser beams 52 which have been converted by the collimator lens 54 to collimated beams enter an inclined surface of the triangular prism 70A. The laser beams 52 are subjected to refraction at the inclined surface and come out from the exit surface of the prism 70A with an angle substantially perpendicular to the exit surface. Therefore, refraction at the inclined surface causes expansion of the laser beam diameter in the direction parallel to the plane of incidence to be performed. Such beam reshaping means using triangular prisms is described in, for example, Japanese Patent Publication (Kokoku) No. SHO61-53,775. In the first beam reshaping means 70 shown in FIG. 9, the triangular prism 70B having the same shape as 70A is disposed behind the triangular prism 70A so that the beam diameter of the laser beams 52 in the direction parallel to the plane of incidence, which have been expanded in the same direction by the triangular prism 70A, are again expanded. The second beam reshaping means 71 functions in the reverse manner as the first beam reshaping means 70. Namely, the laser beams 52 enter substantially perpendicularly the triangular prism 71A, and, reversely, the laser beam diameter in the direction parallel to the plane of incidence is reduced by a refraction when the laser beams come out from the triangular prism 71A. Also in this means, the two-stage beam diameter reduction using the two triangular prisms 71A and 71B is performed. The ratio of the divergence angle of the semiconductor laser array device 51 is represented by M, and the beam expansion ratio of the first beam reshaping means 70 is represented by T·M. The symbol T is a beam diameter expansion coefficient and greater than 1.

On the other hand, the beam expansion ratio of the second beam reshaping means 71 is represented by 1/T. This allows the beam expansion ratio of the laser beams 52 which have passed through the first and second beam reshaping means 70 and 71, to be finally equal to M or coincident with the ratio of the divergence angles. In other words, the first beam reshaping means 70 expands the beam diameter with a factor greater than the ratio of the divergence angles, and the second beam reshaping means 71 then reduces the beam diameter to become coincident with the ratio of the divergence angles.

Figure 10:
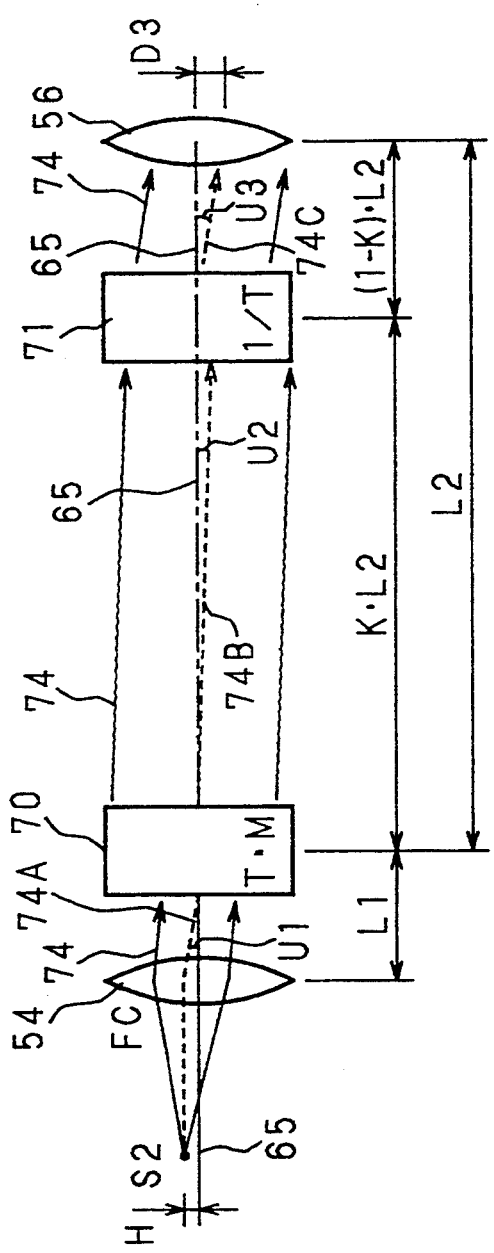
FIG. 10 is a plan view of the main portion of the optical system and for illustrating the correction of the deviation of the central ray in the optical recording apparatus of FIG. 9.

The deviation of the central ray at the objective in the optical system shown in FIG. 9 is obtained as follows. FIG. 10 is a plan view of the main portion for obtaining the deviation of the central ray in the optical system. In the figure, S2 designates a light emitting point displaced by H from the optical axis 65. The collimated beams 74 coming out from the collimator lens 54 are inclined with respect to the optical axis 65. The inclination of the central ray 74A between the collimator lens 54 and the first beam reshaping means 70 and the distance therebetween are respectively represented by U1 and L1, the inclination of the central ray 74B between the first beam reshaping means 70 and the second beam reshaping means 71 is represented by U2, and the inclination of the central ray 74C between the second beam reshaping means 71 and the objective 56 is represented by U3. The distance between the first beam reshaping means 70 and the objective 56 is represented by L2. When introducing a coefficient K (referred to as "distance coefficient") which is greater than 0 and smaller than 1, the distance between the first beam reshaping means 70 and the second beam reshaping means 71 can be represented by K·L2, and the distance between the second beam reshaping means 71 and the objective 56 can be represented by (1−K)·L2.

The inclinations U1, U2 and U3 of the central rays 74A, 74B and 74C at the respective positions can be expressed as follows:

$$U1 = H/FC \tag{9}$$

$$U2 = H/FC/T/M \tag{10}$$

$$U3 = H/FC/M \tag{11}$$

The deviation D1 of the central ray 74A from the optical axis 65 at the first beam reshaping means 70 can be given by the following expression:

$$\begin{aligned} D1 &= L1 \cdot U1 - H \\ &= L1 \cdot H/FC - H \\ &= (L1/FC - 1) \cdot H \end{aligned} \tag{12}$$

The deviation D2 of the central ray 74B from the optical axis 65 at the second beam reshaping means 71 can be given the following expression:

$$D2 = K \cdot L2 \cdot U2 + D1 \cdot T \cdot M \tag{13}$$

The deviation D3 of the central ray 74C from the optical axis 65 at the objective 56 can be given by the following expression:

$$D3 = (1-K) \cdot L2 \cdot U3 + D2/T \tag{14}$$

When the distance L1 is set to be equal to the focal length FC of the collimator lens 54 in the same manner as the conventional example, D1 of expression (12) is zero, and expression (14) can be arranged as follows:

$$\begin{aligned} D3 &= (1-K) \cdot L2 \cdot U3 + K \cdot L2 \cdot U2/T \\ &= ((1-K) + K/T/T) \cdot H \cdot L2/FC/M \end{aligned} \tag{15}$$

Here, a factor P relating to the distance and the expansion ratio is defined as follows:

$$P = (1-K) + K/T/T \tag{16}$$

If the second beam reshaping means 71 is not provided, both K and T in the above expression are 1 and hence P is 1, resulting in that expression (15) coincides with expression (8) derived in the conventional example. If P is set to be less than 1, the deviation D3 of the central ray can be reduced. It will be noted that this can be accomplished by setting both the distance coefficient K and the beam diameter expansion coefficient T to be large numbers. The distance coefficient K can be increased by shortening the distance between the second beam reshaping means 71 and the objective 56. The beam diameter expansion coefficient T can be increased by setting the expansion ratio of the first beam reshaping means 70 greater than the ratio of the divergence angles of the semiconductor laser array device 51.

Figure 11:
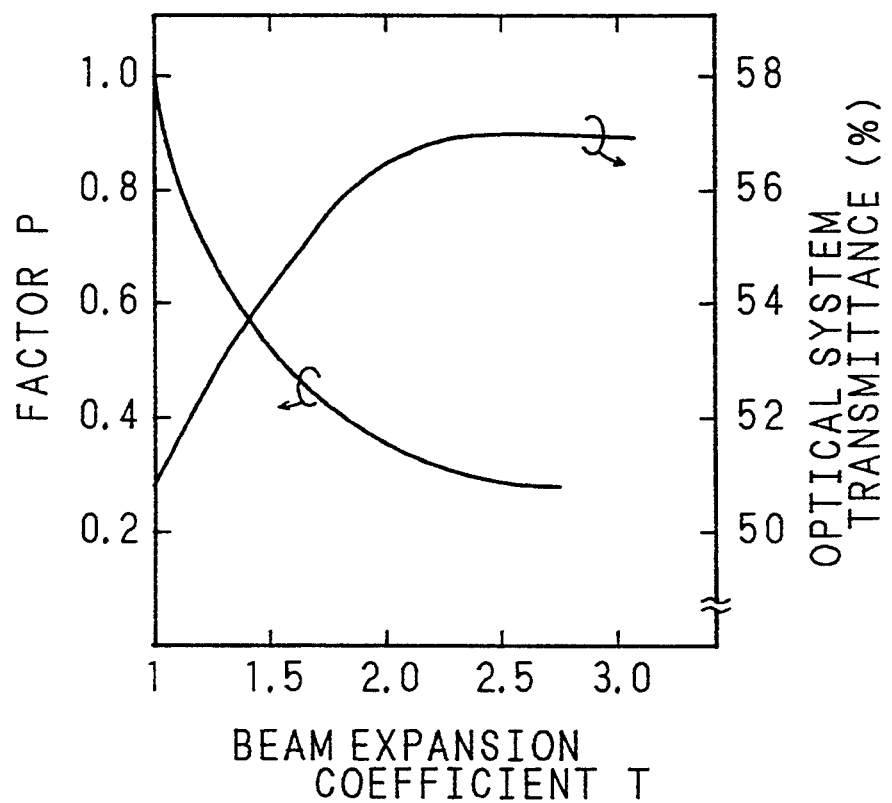
FIG. 11 is a graph showing the relationship between the beam expansion ratio and the transmittance of the optical system in the first embodiment.

The deviation of the central ray and the reduction of the transmittance in the optical system will be described by illustrating a specific example. FIG. 11 is a graph showing the relationships between the optical path length and the central ray deviation and transmittance in the optical system comprising the first and second beam reshaping means 70 and 71. The abscissa is the beam diameter expansion coefficient T, the left ordinate is the factor P, and the right ordinate is the transmittance of the optical system. The calculation conditions are listed below.

The divergence angle of the semiconductor laser beam in the lateral direction was 10 deg. (full angle at half maximum).

The divergence angle of the semiconductor laser beam in the vertical direction was 30 deg. (full angle at half maximum).

The distance H between the light emitting point of the semiconductor laser device and the optical axis was 0.2 mm The beam diameter expansion ratio M was 3.

The focal length FC of the collimator lens was 7 mm.

The focal length FO of the objective was 4 mm.

The aperture radius RO of the objective was 2 mm.

The transmittance of the optical components was 100%.

The distance L2 between the collimator lens 54 and the objective 56 was 100 mm.

The distance coefficient K was 0.2.

Figure 5:
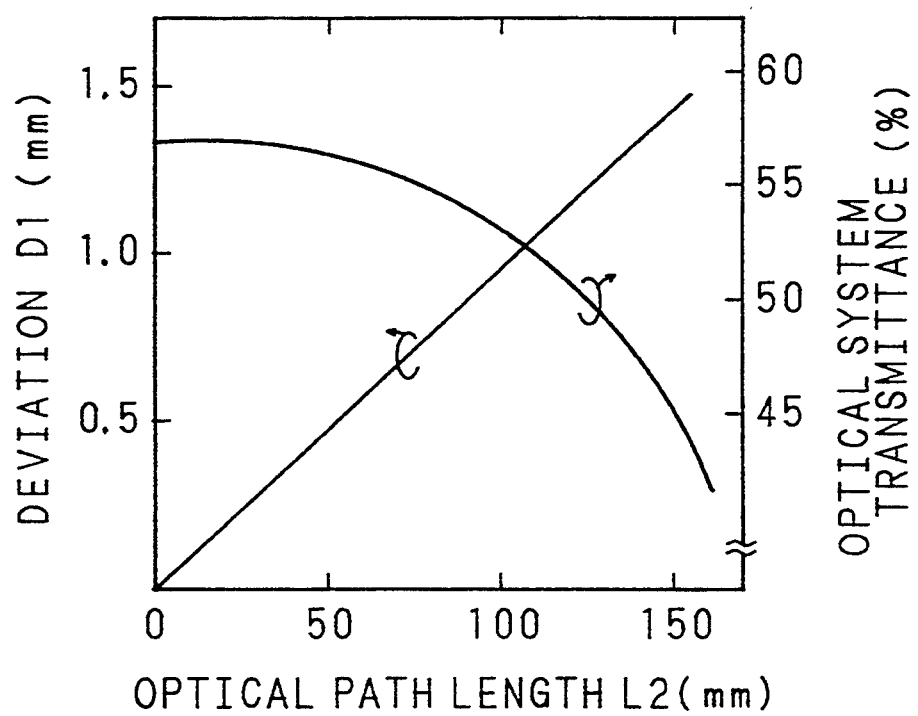
FIG. 5 is a graph showing the relationships between the deviation of the central ray and optical system transmittance and the optical path length in an optical system.

In the calculation of the transmittance of the optical system, it was assumed that the intensity profile of the beam radiated by of the semiconductor laser device is a 2-dimensional Gaussian distribution. The case that the beam diameter expansion coefficient T is 1 corresponds as described above to the case that the second beam reshaping means 71 is not provided, and in this case the transmittance of the optical system is 51%. When T is 2, the factor P is 0.38 and the transmittance of the optical system is 56.4%. When T is 3, the factor P is 0.29 and the transmittance of the optical system is 56.9%. From FIG. 5, the transmittance of the optical system is 57.5% in the case that the light emitting point is on the optical axis. When the beam diameter expansion coefficient T is 2 or more, therefore, the light loss can be largely reduced, and it can be said the transmittance in this case is substantially the same as that of the light emitting point on the optical axis.

Embodiment 2

Figure 12:
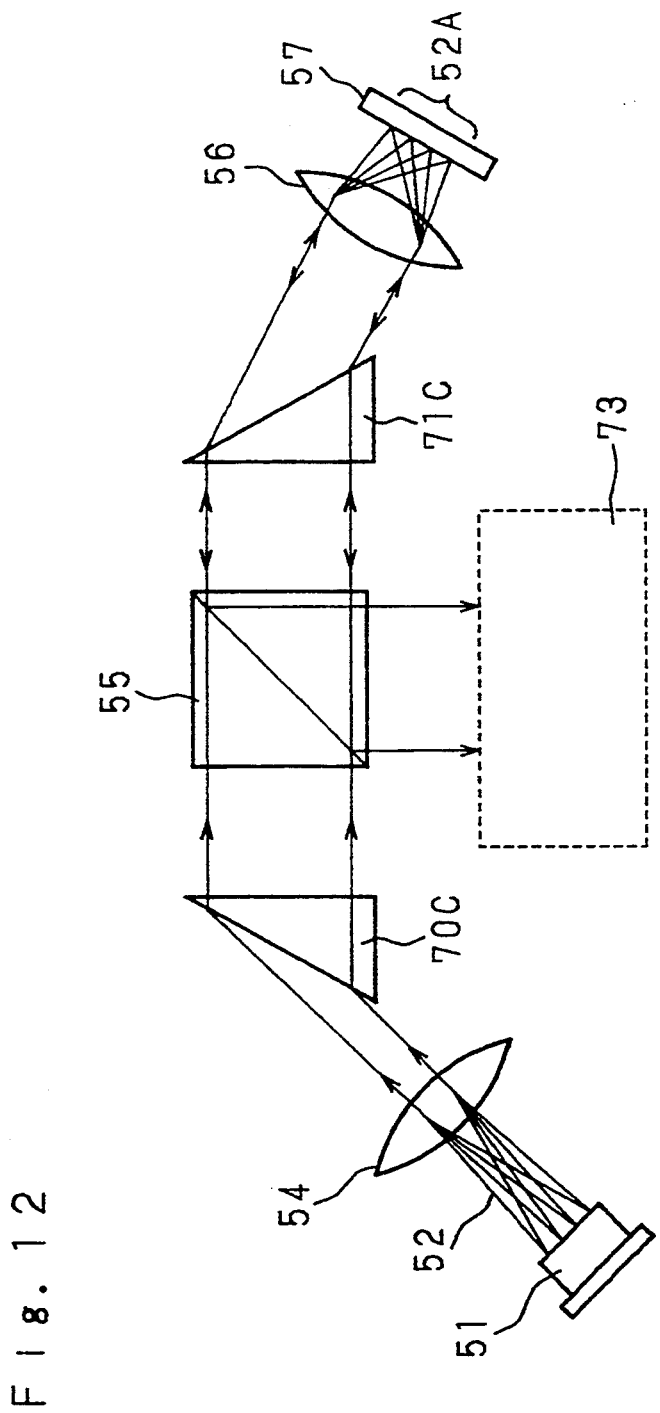
FIG. 12 is a plan view of an optical system of a second embodiment of the optical recording apparatus of the invention.

FIG. 12 is a plan view of an optical system of a second embodiment of the optical recording apparatus of the invention. In the figure, the reference numerals 51, 52, 54–57 and 73 designate the same components as those of FIG. 9. The reference numeral 70C designates a triangular prism which constitutes the first beam reshaping means and which is disposed immediately behind the collimator lens 54 along the direction of the laser beam propagation direction, so as to function as an anamorphic beam diameter expander in the direction of the arrangement of the light emitting points of the semiconductor laser array device 51. The reference numeral 71C designates a triangular prism which constitutes the second beam reshaping means and which is disposed immediately before the objective 56 along the direction of the laser beam propagation direction, so as to function as an anamorphic beam diameter reducer in the direction of the arrangement of the light emitting points of the semiconductor laser array device 51. In Embodiment 1, each beam reshaping means consists of two stages of triangular prisms. By contrast, in Embodiment 2, each beam reshaping means consists of one stage of a triangular prism.

When the triangular prisms 70A–70C and 71A–71C used in Embodiments 1 and 2 are of the achromatic type, the angular deviation of the central ray which may be caused by the variation of the oscillation wavelength of each light emitting point of the semiconductor laser array device 51 or by the difference among oscillation wavelengths of light emitting points can be eliminated.

Embodiment 3

Figure 13:
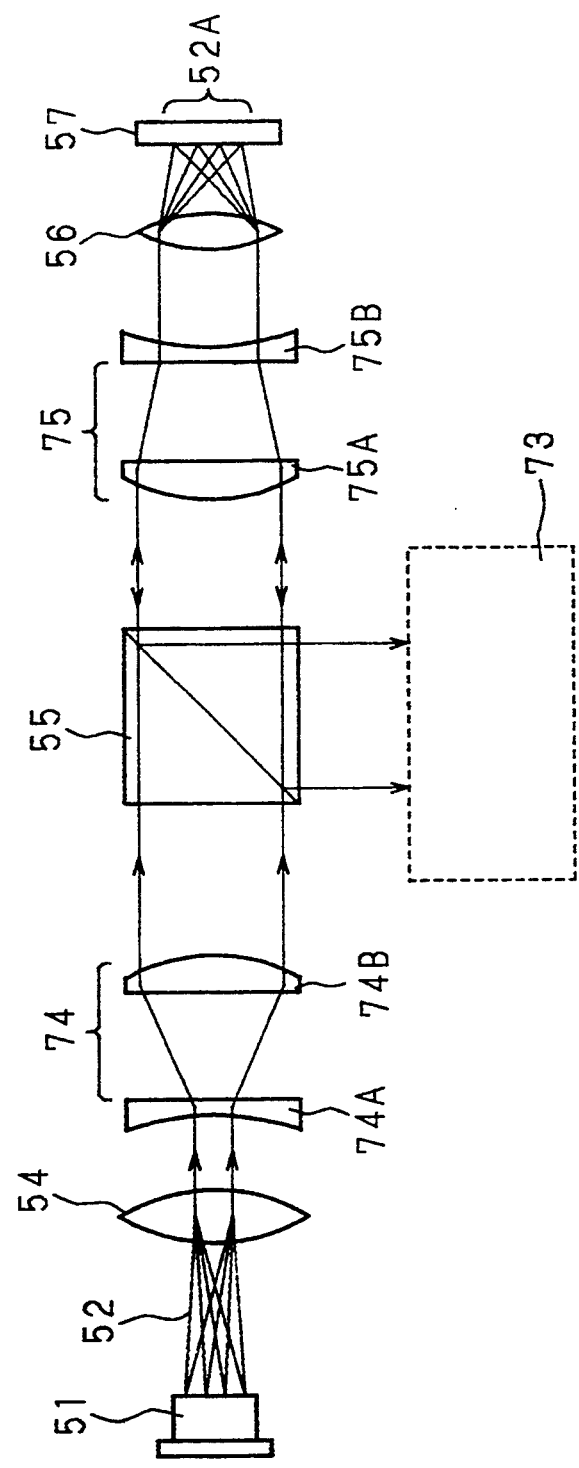
FIG. 13 is a plan view of an optical system of a third embodiment of the optical recording apparatus of the invention.

FIG. 13 is a plan view of an optical system of a third embodiment of the optical recording apparatus of the invention. In the figure, the reference numerals 51, 52, 54–57 and 73 designate the same components as those of FIG. 9. In Embodiments 1 and 2, each beam reshaping means comprises one or more triangular prisms. Alternatively, each beam reshaping means may comprise one or more cylindrical lenses. The reference numeral 74 designates the first beam reshaping means consisting of a cylindrical concave lens 74A and cylindrical convex lens 74B which are arranged so as to retain an anamorphic a lens function in the direction of arrangement of the light emitting points of the semiconductor laser array device 51. The reference numeral 75 designates the second beam reshaping means consisting of a cylindrical convex lens 75A and cylindrical concave lens 75B which are arranged so as to retain an anamorphic lens function in the direction of arrangement of the light emitting points of the semiconductor laser array device 51. The beam reshaping using cylindrical lenses is a known technique described in, for example, Japanese Patent Publication (Kokoku) No. SHO62-32,532. FIG. 13 shows the beam reshaping means consisting of a combination of a cylindrical concave lens and a cylindrical convex lens. The beam reshaping may be performed using a combination of two cylindrical convex lenses.

Embodiment 4

Figure 14:
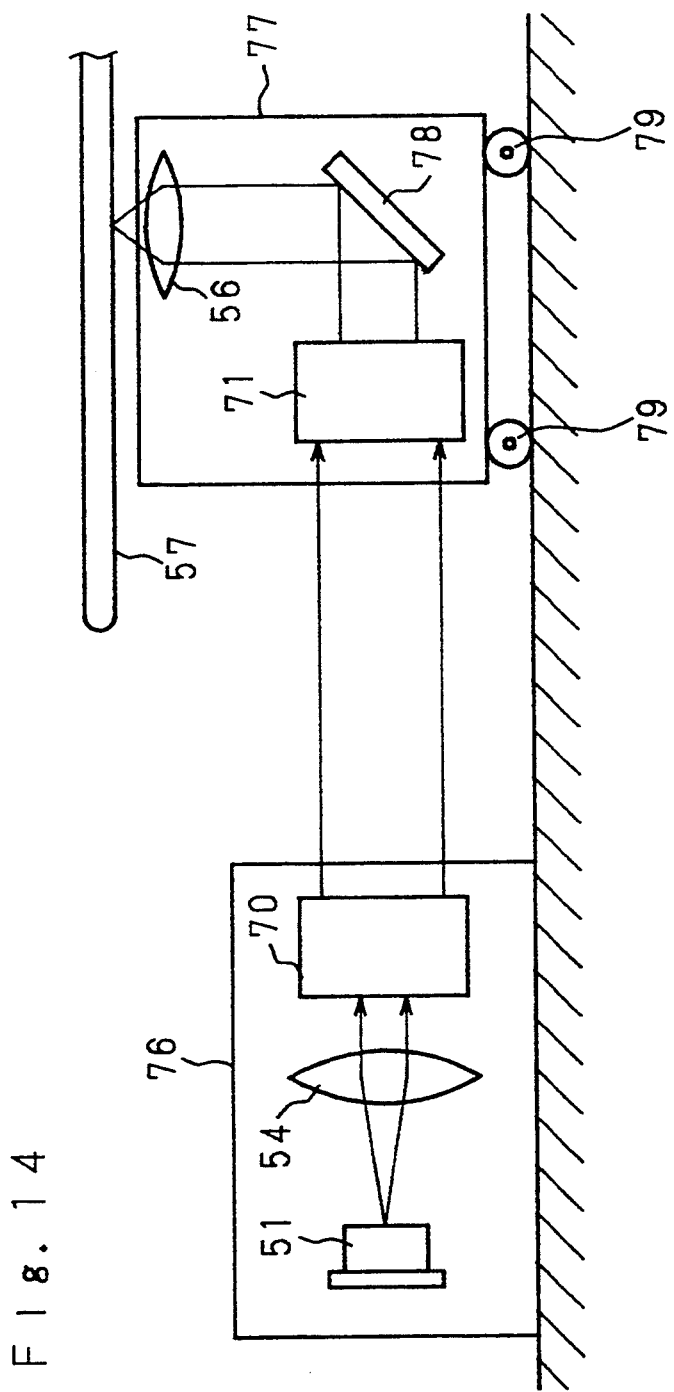
FIG. 14 is a plan view of an optical system of a fourth embodiment of the optical recording apparatus of the invention.

FIG. 14 is a plan view of an optical system of a fourth embodiment of the optical recording apparatus of the invention. In the figure, the reference numerals 51, 52, 54–57, 70 and 71 designate the same components as those of FIG. 9. The reference numeral 76 designates a fixed unit of an optical head which includes some of the components constituting the optical heads such as the semiconductor laser array device 51, the collimator lens 54, the first beam reshaping means 70, and the detection optical system (not shown). The reference numeral 77 designates a moving unit of the optical head which includes the other ones of the components constituting the optical heads such as the objective 56, a reflecting mirror 78, and the second beam reshaping means 71. The moving unit 77 is positioned at a proper location of the information recording medium 57 by a driving mechanism 79. This configuration where the optical head is divided into the fixed unit 76 and the moving unit 77 reduces the weight of the moving unit 77, thereby allowing the positioning operation to be quickly performed. In this configuration, the distance between the collimator lens 54 and the objective 56 always varies in accordance with the location of the moving unit 77, and at the same time also the deviation of the central ray given by expression (15) varies. However, the configuration where the first beam reshaping means 70 is disposed in the fixed unit 76 so as to be in proximity of the collimator lens 54 and the second beam reshaping means 71 is disposed in the moving unit 77 so as to be in proximity of the objective 56 can suppress the deviation of the central ray of a laser beam emitted from a light emitted point displaced from the optical axis, and also the variation thereof. Therefore, the variation of the light amount due to the movement of the moving unit 77 can be suppressed to a small level.

In the embodiments described above, the divergence angle of the beam radiated from the semiconductor laser array device 51 varies depending on the direction or the radiated beam is elliptic. The invention may be applicable also to the case where the beam is isotropic. That is, even when the divergence angle is isotropic, the deviation of the central ray of a laser beam emitting from a light emitted points displaced from the optical axis can be suppressed by expanding the beam diameter in the arrangement direction of the light emitting points and then reducing the beam diameter in this direction and immediately before the objective 56. In such a case, the calculations subsequent to expression (9) can be performed while M is set to be 1.

Embodiment 5

Figure 6:
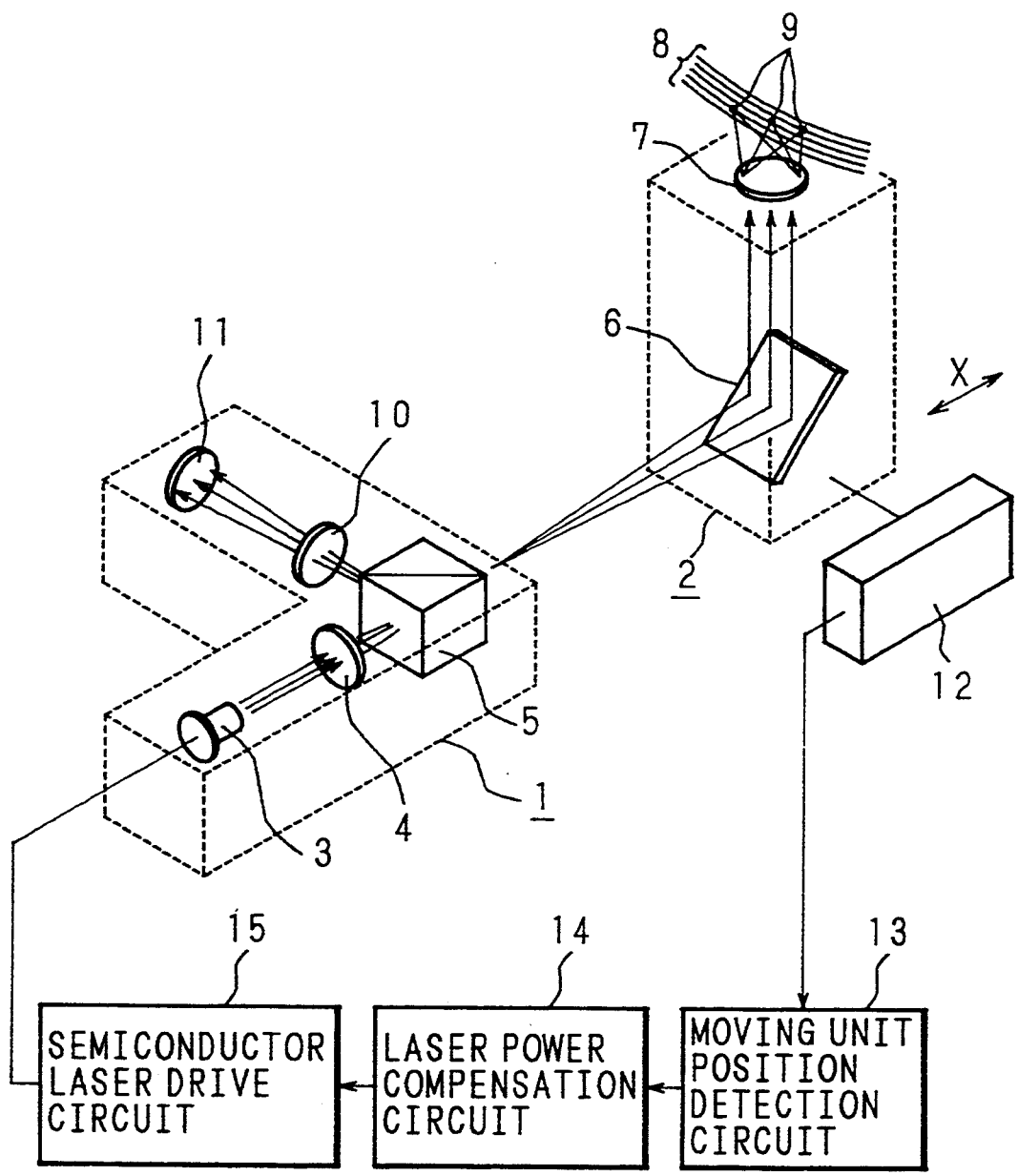
FIG. 6 is a perspective view of a conventional optical recording apparatus comprising a separation type optical head.
Figure 15:
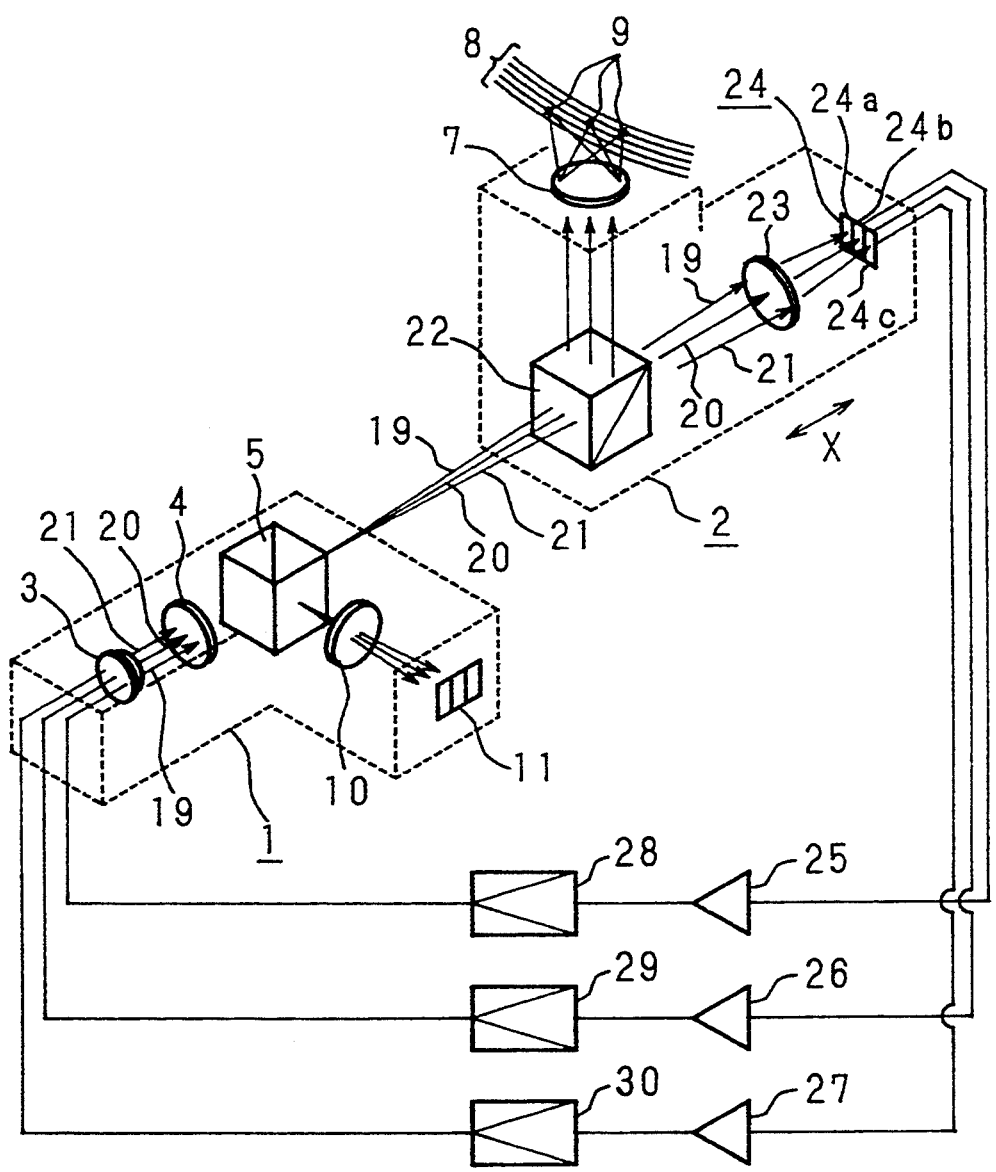
FIG. 15 is a plan view of an optical system of a fifth embodiment of the optical recording apparatus of the invention.

FIG. 15 is a perspective view showing the configuration of a fifth embodiment of the optical recording apparatus of the invention. In the figure, the reference numerals 1-5 and 7-11 designate the same components as those of FIG. 6. The reference numerals 19-21 designate three laser beams emitted from the three-beam semiconductor laser array device 3, respectively. The reference numeral 22 designates a beam splitter disposed in the moving unit 2 in such a manner that the laser beams 19, 20 and 21 emitted from the fixed unit 1 are reflected toward the objective 7 and passed through the beam splitter. The reference numeral 23 designates a lens which has the same aperture diameter as that of the objective 7 and which is disposed at such a location that the optical distance between the lens and the beam splitter 22 is equal to that between the beam splitter 22 and the objective 7. The reference numeral 24 designates a three-segment photodiode which comprises three light receiving elements and which is disposed at a location substantially identical with the focal position of the lens 23 so that the light receiving elements 24a, 24b and 24c individually receive the laser beams 19, 20 and 21. The reference numerals 25, 26 and 27 designate current-voltage converters which are respectively connected to the light receiving elements 24a, 24b and 24c of the three-segment photodiode 24. The reference numerals 28, 29 and 30 designate laser device driving circuits which are respectively connected to the current-voltage converters. The outputs of the three laser device driving circuits 28, 29 and 30 are connected to the semiconductor laser array device 3.

Figure 7:
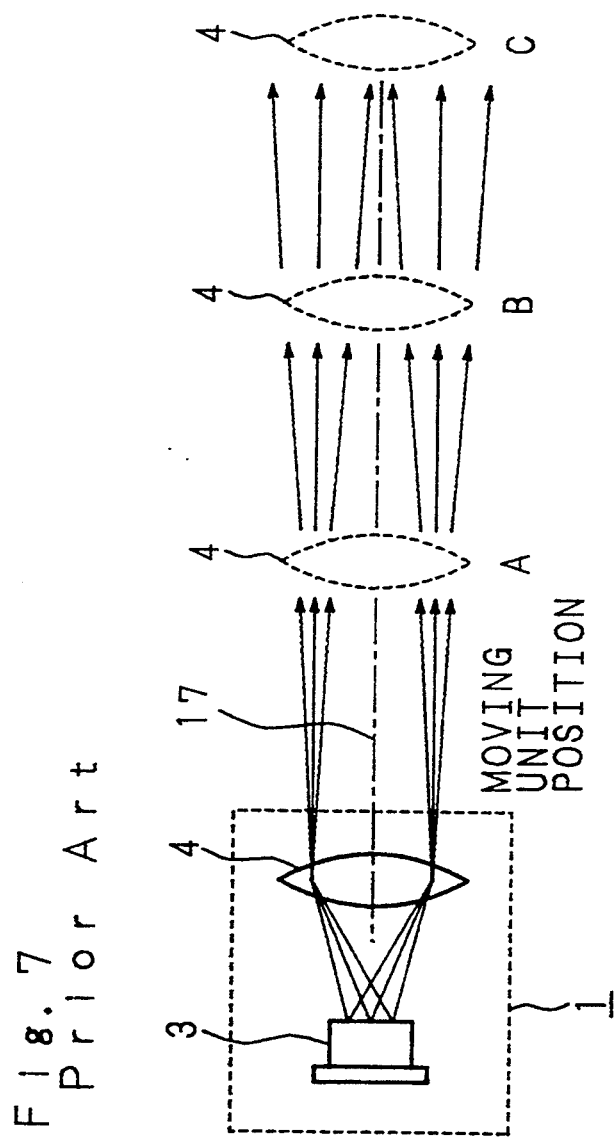
FIG. 7 is a development of an optical system of the optical recording apparatus of FIG. 6.
Figure 8:
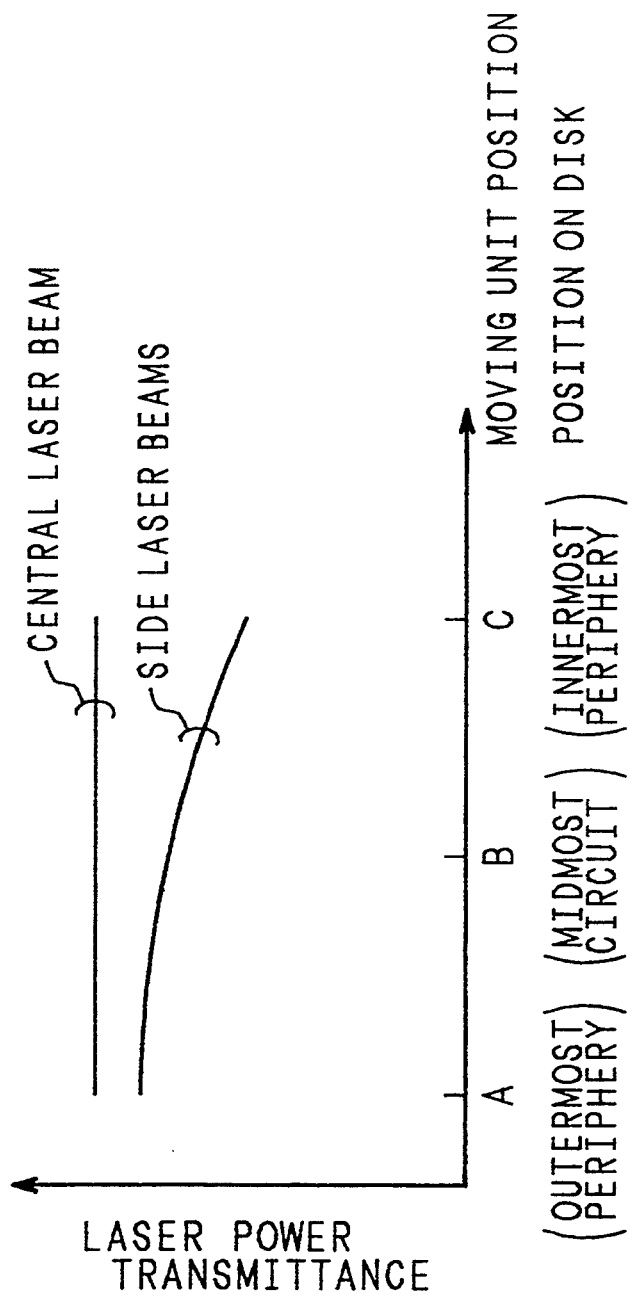
FIG. 8 is a graph showing the relationship between the position of a moving unit of the optical head and the laser power transmittance of the optical recording apparatus of FIG. 6.

Next, the operation of the embodiment will be described referring also to FIG. 16 which is a plan view showing the moving unit 2 in detail. The objective 7 has the aperture diameter d and is disposed at a location separated from the beam splitter 22 by a distance 1 in the reflection direction thereof. Similarly, the lens 23 has the aperture diameter d and is disposed at a location separated from the beam splitter 22 by a distance 1 in the transmission direction thereof. As described in conjunction with FIG. 7, regarding a laser beam emitted from a light emitted points displaced from the optical axis, a deviation from the optical axis occurs at the objective 7, whereby the light amount is reduced. Since the lens 23 disposed in the transmission direction of the beam splitter 22 is located at a position optically equivalent to the position of the objective 7, the deviation from the optical axis occurring at the objective 7 similarly occurs in the lens 23. Therefore, the three laser beams 19, 20 and 21 which have passed through the lens 23 are individually detected by the three-segment photodiode 24 disposed at a location substantially identical with the focal position of the lens 23, whereby laser powers respectively proportional to the three laser beams which have actually passed through the objective 7 and been irradiated on the surface of the information recording medium can be detected. The laser powers of the laser beams which are detected by the three-segment photodiode 24 are converted by the current-voltage converters 25, 26 and 27 to voltage signals indicative of the laser powers, respectively. Then, the laser device driving circuits 28, 29 and 30 drive the semiconductor laser array device 3 so that the laser beams 19, 20 and 21 respectively have a predetermined laser power.

As described above, the laser beams 19, 20 and 21 of the semiconductor laser array device 3 are split by the beam splitter 22, the reflected beams are used for recording, reproducing or erasing information, and the transmitted beams are used for detecting the laser powers of the laser beams on the surface of the information recording medium. With respect to transmitted beams, it is required only to ensure the transmittance sufficient for detecting a laser power. In contrast, with respect to reflected beams, it is required for the reflection coefficient to ensure the laser power necessary for recording information on or erasing information from the surface of the information recording medium. To comply with this requirement, therefore, the light split ratio (reflection coefficient to transmittance) of the beam splitter 22 is set so that the laser power toward the information recording medium is greater.

Embodiment 6

Next, a sixth embodiment of the invention will be described. FIG. 17 is a plan view of the moving unit 2 showing the sixth embodiment of the invention. In the figure, the reference numerals 2, 7, 8, 22 and 24 designate the same components as those of FIG. 16. The reference numeral 31 designates an aperture which has the aperture diameter same as that of the objective 7 and which disposed at such a location that the optical distance between the lens and the beam splitter 22 is equal to that between the beam splitter 22 and the objective 7. The reference numeral 32 designates a lens which is disposed behind the aperture 31 and which has the aperture diameter not less than that of the aperture 31. The three-segment photodiode 24 is disposed at a location substantially identical with the focal position of the lens 32.

Figure 16:
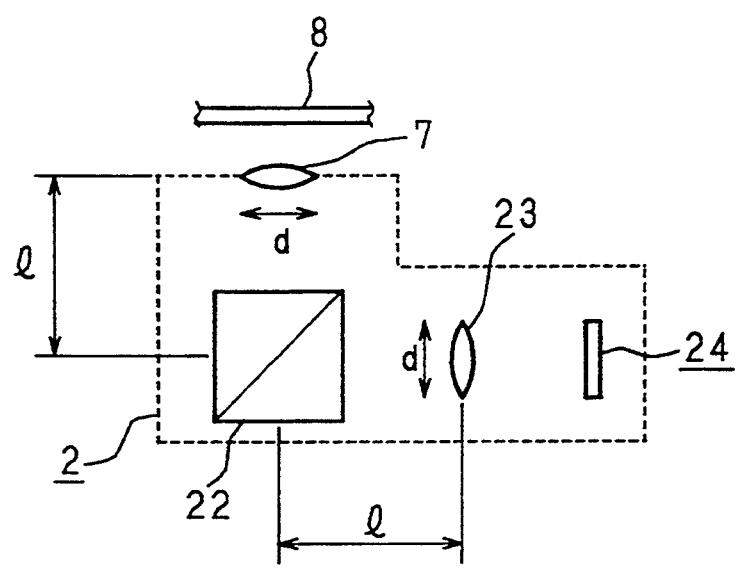
FIG. 16 is a plan view of a moving unit of an optical head of the fifth embodiment.
Figure 17:
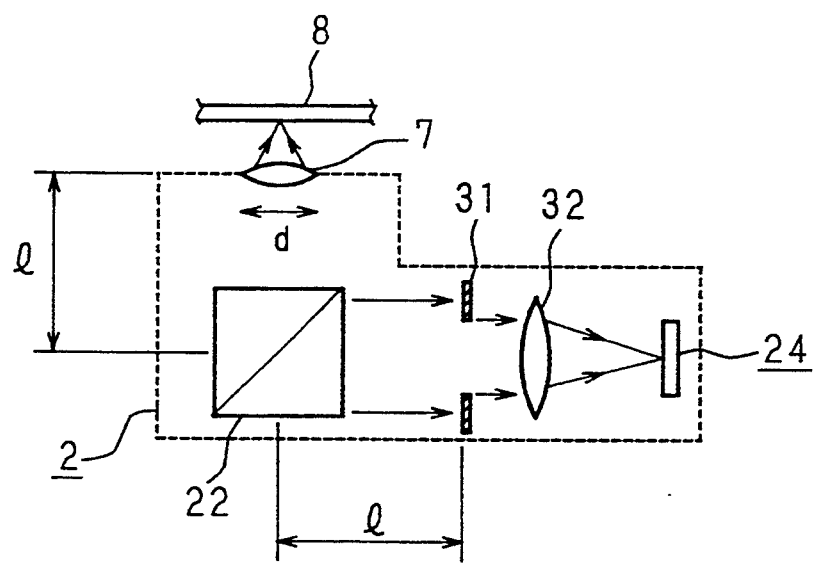
FIG. 17 is a plan view of a moving unit of an optical head of a sixth embodiment of the optical recording apparatus of the invention.

In this embodiment, since the aperture 31 disposed in the transmission direction of the beam splitter 22 is located at the position optically equivalent to the position of the objective 7 in the same manner as the lens 23 shown in FIG. 16, the deviation from the optical axis occurring at the objective 7 similarly occurs in the aperture 31. Therefore, the three laser beams 19, 20 and 21 which have passed through the aperture 31 are converged by the lens 32 and individually detected by the three-segment photodiode 24 disposed at a location substantially identical with the focal position of the lens 23, whereby laser powers respectively proportional to the three laser beams which have actually passed through the objective 7 and been irradiated on the surface of the information recording medium can be detected.

Embodiment 7

Figure 18:
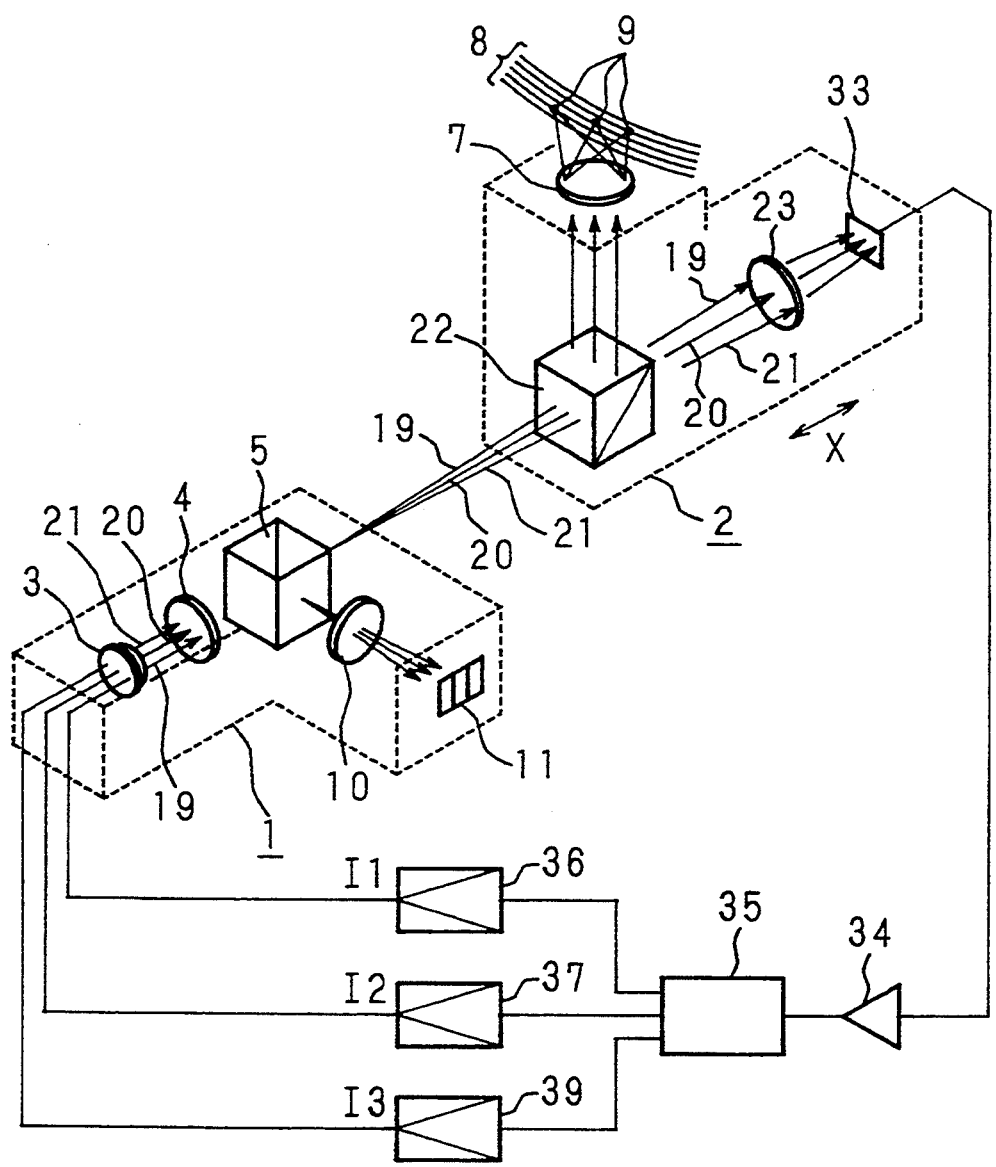
FIG. 18 is a perspective view of an optical system of a seventh embodiment of the optical recording apparatus of the invention.

Next, a seventh embodiment of the invention will be described. FIG. 18 is a perspective view showing the configuration of the seventh embodiment of the invention. In the figure, the reference numerals 1-5, 7-11 and 19-23 designate the same components as those of FIG. 15. The reference numeral 33 designates an photodiode which comprises a single light receiving element and which is disposed at a location substantially identical with the focal position of the lens 23 so as to collectively receive the laser beams 19, 20 and 21. The reference numeral 34 designates a current-voltage converter which is connected to the optical detector 33. The reference numeral 35 designates a laser device drive controller which is connected to the current-voltage converter. The reference numerals 36, 37 and 38 designate laser device driving circuits which are connected to the laser device drive controller. The outputs of the three laser device driving circuits 36, 37 and 38 are coupled to the semiconductor laser array device 3.

Next, the operation of Embodiment 7 will be described referring also to FIG. 19 which is a timing chart illustrating the control of the laser powers of the three laser beams 19, 20 and 21. Since the lens 23 has the same aperture diameter as that of the objective 7 and is located at a position optically equivalent to the position of the objective 7 in the same manner as Embodiment 5, the loss of the laser power which is equal to that occurring at the objective 7 similarly occurs in the lens 23, when the laser beams pass through the lens 23. The laser beams are converged by the lens 23 and then collectively received by the photodiode 33.

Figure 19:
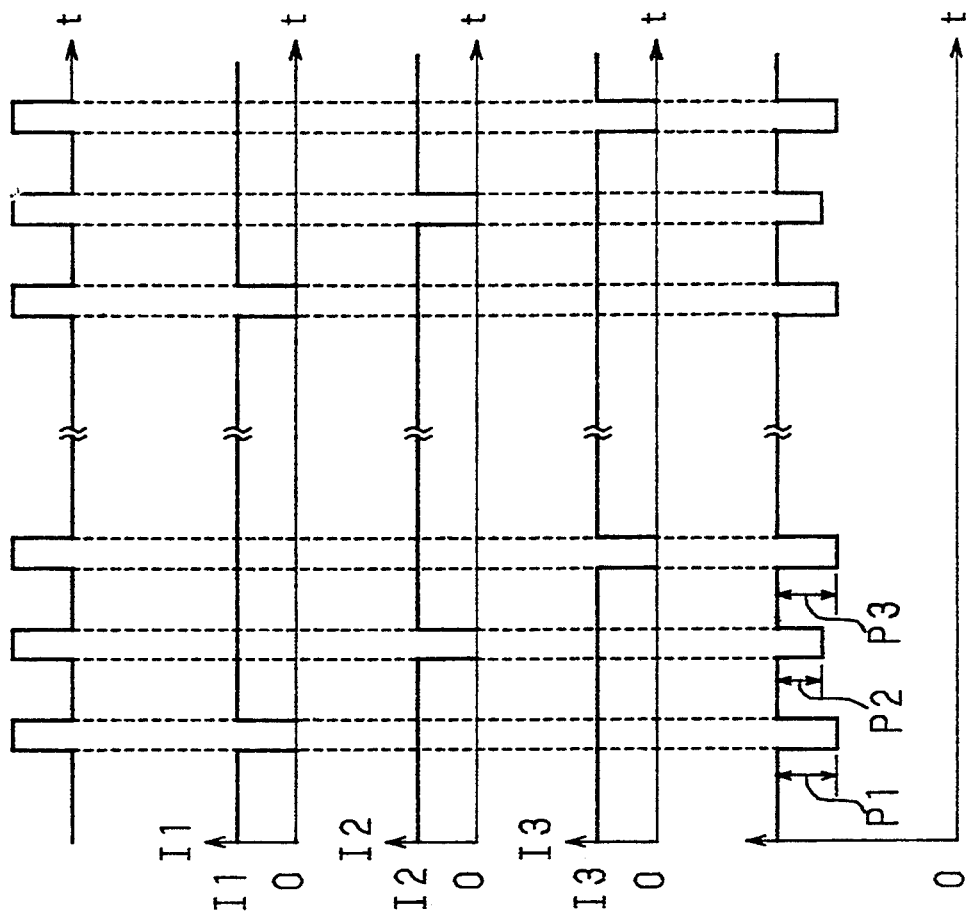
FIG. 19(A) through FIG. 19(E) are timing charts of the laser power driving in the seventh embodiment.

In FIG. 19, (A) shows a timing signal generated by the laser device drive controller 35. In the figure, (B), (C) and (D) respectively show the driving currents applied from the laser device driving circuits 36, 37 and 38 to the semiconductor laser array device 3, and (E) shows the laser power detected by the photodiode 33. In this example, the three laser beams 19, 20 and 21 are emitted with the laser powers P1, P2 and P3, respectively. Under the condition that all the laser beams are emitted, a first timing signal 39 is firstly generated to temporarily switch off a driving current I1 which is output from the laser device driving circuit 36 for emitting the laser beam 19. At this time, the detection state of the photodiode 33 is changed from that where the total power of the three laser beams is detected to that where the power which is less than the total power by the power P1 of the laser beam 19 is detected. This reduction of the detected level corresponds to the laser power at which the laser beam 19 has been emitted. When this reduction is detected by the laser device drive controller 35 and the laser device driving circuit 36 is operated in such a manner that this reduction is equal to the predetermined laser power, therefore, the power of the laser beam 19 can be maintained at the predetermined laser power. Similarly, a second timing signal 40 is then generated to temporarily switch off a driving current I2 which is output from the laser device driving circuit 37 for emitting the laser beam 20. At this time, the detection state of the photodiode 33 is changes from that where the total power of the three laser beams is detected to that where the power which is less than the total power by the power P2 of the laser beam 20 is detected. This reduction of the detected level corresponds to the laser power at which the laser beam 20 has been emitted. When this reduction is detected by the laser device drive controller 35 and the laser device driving circuit 37 is operated in such a manner that this reduction is equal to the predetermined laser power, therefore, the power of the laser beam 20 can be maintained at the predetermined laser power. Thereafter, a third timing signal 41 is generated, and in the same way the power of the laser beam 21 can be maintained at the predetermined laser power.

As described above, by sequentially switching off the emission of one of laser beams, the laser powers of the laser beams can be individually detected in a time series manner, thereby enabling the laser beams to be controlled at the predetermined laser power. Therefore, the series of operations may be repealed as required.

Embodiment 8

Figure 20:
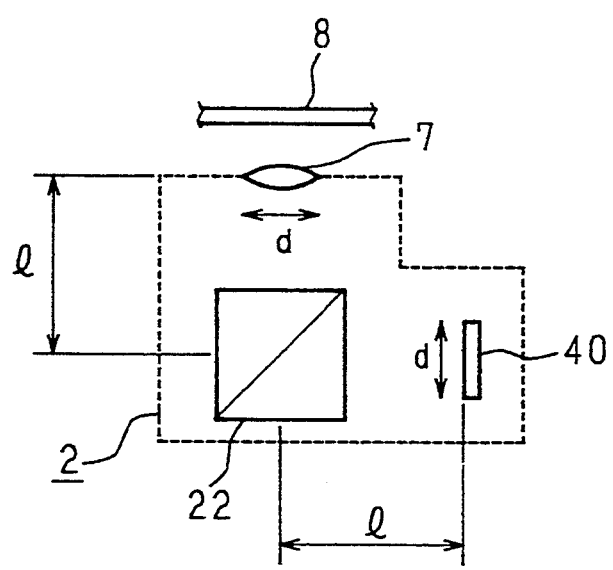
FIG. 20 is a plan view of a moving unit of an optical head of an eighth embodiment of the optical recording apparatus of the invention.

Next, an eighth embodiment of the invention will be described. In the fifth and seventh embodiments, as shown in FIG. 16, the lens 23 has the aperture diameter same as that of the objective 7 and is disposed at such a location that the optical distance between the lens and the beam splitter is equal to that between the beam splitter 22 and the objective 7. Alternatively, as shown in FIG. 20, an photodiode 40 in which the diameter of a light receiving face is equal to the aperture diameter of the objective may be disposed in place of the lens 23.

Embodiment 9

In Embodiment 7 described above, in order to control the laser powers of the three laser beams 19, 20 and 21, the three timing signals 39, 40 and 41 are generated so that the emissions of the three laser beams are sequentially switched off in accordance with the timing signals. If the emissions of two laser beams are sequentially switched off and the laser powers of the two laser beams are detected, the laser power of the remaining laser beam can be obtained by subtracting the detected laser powers from the total laser powers obtained when the three laser beams are simultaneously emitted. Therefore, the laser beams the number of which is less than the total number of the laser beams by one may be sequentially subjected to the switching off of the emission.

Embodiment 10

Furthermore, in Embodiment 7, in order to control the laser powers of the three laser beams 19, 20 and 21, the emissions of the three laser beams are sequentially switched off one by one in accordance with the timing signals. The invention is applicable also to a configuration in which only one laser beam is emitted, the emissions of all the remaining laser beams are switched off and then the laser beams are sequentially emitted one by one in accordance with the timing signals. In this configuration, when the laser beams the number of which is less than the total number of the laser beams by one are sequentially emitted, the laser powers of all the laser beams can be individually detected.

As this inveniton may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An optical system for use in a recording apparatus where a plurality of collimated beams from a plurality of laser beam sources are irradiated on an information recording medium comprising:

first beam reshaping means disposed after said plurality of laser beam sources in a laser propagation direction, for anamorphically expanding the plurality of collimated beam diameters in a first direction along which said plurality of laser beam sources are arranged, in order to change a ratio of the plurality of beam diameters in the first direction to the plurality of beam diameters in a second direction, perpendicular to the first direction; and second beam reshaping means disposed between said first beam reshaping means and said information recording medium, for anamorphically reducing the plurality of collimated beam diameters in the same direction as said first beam reshaping means which expands the plurality of collimated beam diameters in order to decrease the ratio.

2. An optical system for use in a recording apparatus where a plurality of laser beams from a laser array device having a plurality of beam sources are irradiated on an information recording medium through an optical system to record information, comprising:

a collimator lens for collimating the plurality of laser beams from the laser array device to form a plurality of collimated beams;

first beam reshaping means disposed immediately after said collimator lens in a laser beam propagation direction, for anamorphically expanding a plurality of collimated beam diameters in a lateral direction along which said plurality of beam sources are arranged, to increase a lateral beam diameter to vertical beam diameter ratio; wherein the lateral beam diameter is perpendicular to the vertical beam diameter;

an objective for focusing the plurality of laser beams onto the information recording medium; and second beam reshaping means disposed immediately before said objective in the laser beam propagation direction, for anamorphically reducing the plurality of collimated beam diameters in the lateral direction to make said plurality of collimated beams approximately circular.

3. An optical system for use in recording apparatus according to claim 2, wherein said laser array device is a semiconductor laser array device.

4. An optical system for use in recording apparatus according to claim 2, wherein said first and second beam reshaping means each include a pair of triangular prisms.

5. An optical system for use in recording apparatus according to claim 4, wherein each of said pair of triangular prisms are achromatic.

6. An optical system for use in recording apparatus according to claim 2, wherein said first and second beam reshaping means each include a triangular prism.

7. An optical system for use in recording apparatus according to claim 6, wherein each of said triangular prisms is achromatic.

8. An optical system for use in recording apparatus according to claim 2, wherein said first and second beam reshaping means each include cylindrical lenses.

9. An optical system for use in recording apparatus with a separated optical head which includes a fixed unit provided with a laser array having a plurality of beam sources and a moving unit provided with an objective to focus the laser beams from the fixed unit onto an information recording medium thereby to record information, comprising:

first beam reshaping means disposed in the fixed unit, for anamorphically expanding a plurality of collimated beam diameters in a lateral direction along which said plurality of beam sources are arranged, to increase a lateral beam diameter to vertical beam diameter ratio; wherein the lateral beam diameter is perpendicular to the vertical beam diameter and second beam reshaping means included in the moving unit disposed immediately before an objective in the laser beam propagation direction, for anamorphically reducing the plurality of collimated beam diameters in the lateral direction, to make said collimated beam diameter approximately circular.

10. An optical system, comprising:

first beam reshaping means, disposed in a laser propagation direction, for anamorphically expanding a plurality of collimated beam diameters in a first direction along which a plurality of laser beam sources are arranged; and second beam reshaping means, disposed between said first beam reshaping means and an information medium, for anamorphically contracting the plurality of collimated beam diameters in the first direction.

11. The optical system of claim 10, wherein said first and second beam reshaping means each include a pair of triangular prisms.

12. The optical system of claim 11, wherein each of said pair of triangular prisms are achromatic.

13. The optical system of claim 10, wherein said first and second beam reshaping means each include a triangular prism.

14. The optical system of claim 13, wherein each of said triangular prisms is achromatic.

15. An optical system, comprising:

a collimator lens for forming a plurality of collimated beams;

first beam reshaping means, disposed in a laser propagation direction, for anamorphically expanding a plurality of collimated beam diameters in a lateral direction along which a plurality of beam sources are arranged; and second beam reshaping means, disposed between said first beam reshaping means and an information recording medium, for anamorphically contracting the plurality of collimated beam diameters in the lateral direction.

16. The optical system of claim 15, further comprising an objective after said second beam reshaping means for focusing the plurality of collimated beams onto the information recording medium.

17. The optical system of claim 15, wherein said first beam reshaping means expands the plurality of collimated beam diameters in the lateral direction such that a lateral beam diameter to vertical beam diameter ratio is increased.

18. The optical system of claim 17, wherein said second beam reshaping means contracts the plurality of collimated beam diameters in the lateral direction such that the plurality of collimated beams are made approximately circular.

19. An optical system, comprising:

a fixed unit, including,
first beam reshaping means, disposed in a laser propagation direction, for anamorphically expanding a plurality of collimated beam diameters in a first direction along which a plurality of laser beam sources are arranged; and a moving unit, including,
second beam reshaping means, disposed immediately before an objective in the laser propagation direction, for anamorphically contracting the plurality of collimated beam diameters in the first direction.

20. The optical system of claim 19, wherein the first direction is a lateral direction.

21. The optical system of claim 20, wherein said first beam reshaping means expands the plurality of collimated beam diameters in the lateral direction such that a lateral beam diameter to vertical beam diameter ratio is increased wherein the vertical beam diameter is perpendicular to the lateral beam diameter.

22. The optical system of claim 21, wherein said second beam reshaping means contracts the plurality of collimated beam diameters in the lateral direction such that the plurality of collimated beams are made approximately circular.

* * * * *